United States Patent
Sitrick et al.

(10) Patent No.: US 7,428,757 B2
(45) Date of Patent: *Sep. 23, 2008

(54) SYSTEM AND METHODOLOGY FOR VALIDATING ANTI-PIRACY SECURITY COMPLIANCE AND REPORTING THEREUPON, FOR ONE TO A PLURALITY OF MOVIE THEATERS

(75) Inventors: David H. Sitrick, 820 Burchell, Highland Park, IL (US) 60035; James A. Fancher, Marina Del Ray, CA (US)

(73) Assignee: David H. Sitrick, Highland Park, IL (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/598,448

(22) Filed: Nov. 13, 2006

(65) Prior Publication Data

US 2007/0061890 A1 Mar. 15, 2007

Related U.S. Application Data

(63) Continuation of application No. 10/260,679, filed on Sep. 30, 2002, now Pat. No. 7,170,577, which is a continuation-in-part of application No. 09/671,007, filed on Sep. 27, 2000, now Pat. No. 6,559,883.

(51) Int. Cl.
*H04L 9/00* (2006.01)
(52) U.S. Cl. ....................................................... 726/28
(58) Field of Classification Search ..................... 726/28
See application file for complete search history.

(56) References Cited

U.S. PATENT DOCUMENTS

| 6,018,374 | A  | * | 1/2000 | Wrobleski ................... 348/744 |
| 6,044,471 | A  | * | 3/2000 | Colvin ......................... 726/28 |
| 6,773,119 | B2 | * | 8/2004 | Kimura et al. ............... 353/122 |
| 6,950,532 | B1 | * | 9/2005 | Schumann et al. .......... 382/100 |

* cited by examiner

*Primary Examiner*—Pramila Parthasarathy
(74) *Attorney, Agent, or Firm*—Sitrick & Sitrick

(57) ABSTRACT

A movie anti-piracy system with sensing and reporting is provided. A movie projector projects a light image to reflect off of a screen. An anti-piracy subsystem is utilized to preclude, interfere with and/or prevent videotaping of the light images reflecting from the screen. Anti-piracy compliance sensing selectively provides compliance violation signals respectively to a sensor response controller. The controller is responsive to the compliance violation signals to provide a violation status (and other data) signal output to a control center. The control center responds to the violation status and other data signals, from one or a plurality of theaters, and provides for reporting of information (such as security compliance, attendance, etc.) to one or multiple reporting sites (such as movie distribution studios, etc.). In a preferred embodiment, the control center determines whether there are violations of providing of anti-piracy protection within a theater (or theaters) and provides reporting on the anti-piracy compliance status and data. If a violation is indicated, then the control center sends a violation signal such as to the sensor response controller which can trigger an alarm and/or activate a violation inhibit output to shut down the movie projector and/or communicate to the control center for reporting purposes.

20 Claims, 7 Drawing Sheets

US 7,428,757 B2

SYSTEM AND METHODOLOGY FOR VALIDATING ANTI-PIRACY SECURITY COMPLIANCE AND REPORTING THEREUPON, FOR ONE TO A PLURALITY OF MOVIE THEATERS

RELATED APPLICATIONS

This application is a Continuation of U.S. patent application Ser. No. 10/260,679, entitled, "TARGETED ANTI-PIRACY SYSTEM AND METHODOLOGY," filed Sep. 30, 2002, now U.S. Pat. No. 7,170,577; which is a Continuation-in-part of U.S. patent application Ser. No. 09/671,007, entitled, "A MOVIE FILM SECURITY SYSTEM UTILIZING INFRARED PATTERNS," filed Sep. 27, 2000, now U.S. Pat. No. 6,559,883.

FEDERALLY SPONSORED RESEARCH OR DEVELOPMENT

Not Applicable.

BACKGROUND OF THE INVENTION

This invention relates to a movie projection-based anti-piracy system to be utilized in movie theaters, such as disclosed in co-pending application, U.S. Ser. No. 09/671,007 filed Sep. 27, 2000, and further having sensing and reporting subsystems. Heretofore, pirates with camcorders have been able to illegally make a copy of a film within the movie theater. It is therefore desirable to implement anti-piracy means to preclude, interfere and/or prevent videotaping of a movie. For example, in accordance with the teaching of Applicant's co-pending application, U.S. Ser. No. 09/671,007, an in-theater anti-piracy system and methodology are taught wherein an infrared energy source is used to help defeat the pirate recorder's filter system, to degrade or destroy the quality of the illegal copy. However, there is a need for in-theater violation enforcement and/or for centralized reporting on the use of anti-piracy system in one or a plurality of theaters, and there is a need for customer safety as well.

SUMMARY OF THE INVENTION

A movie anti-piracy system with sensing and reporting is provided. A movie projector projects a light image to reflect off of a screen, while an anti-piracy system is implemented ranging from physical security with people, to an infrared energy projection source generating an infrared energy pattern which is reflected off the screen (or otherwise projected) in the same field of view as the light images reflecting from the screen. Anti-piracy compliance sensing is then provided. In one example, infrared energy sensors are positioned in the seating area of the theater. The infrared sensors provide sensed signals respectively to a sensor response controller. The controller is responsive to the compliance sensing to provide a violation (of compliance) (and other data) signal output to a control center. The control center responds to the compliance status (and other data) signals, from one theater, or a plurality of theaters, and provides for reporting of information (such as security compliance, attendance, etc.) to one or multiple reporting sites (such as movie distribution studios, etc.). In a preferred embodiment, the control center determines whether the compliance sensing or other data indicate violation of anti-piracy protection within a theater and provide reporting on the status and data. If a violation is indicated, then the control center sends a control violation signal to a response controller which can trigger an alarm and/or activate a violation inhibit output to shut down the movie projector. This shut down of the projector is an optional feature. In a preferred embodiment, the shut down can be overridden with the entry of an appropriate security code.

A data entry subsystem permits entry of additional data which is communicated as signals to the response controller. The controller provides for processing the data from the data entry and communicating to the control center. The additional data can include ticket sales for one or more movies, attendance data, security code, etc.

In a preferred embodiment, there are a plurality of theater systems, each of which has an equivalent anti-piracy system installed, each providing reporting back to the control center which provides overall system control.

These and other aspects and attributes of the present invention will be discussed with reference to the following drawings and accompanying specification.

DETAILED DESCRIPTION OF THE PREFERRED EMBODIMENT

Figure 1:
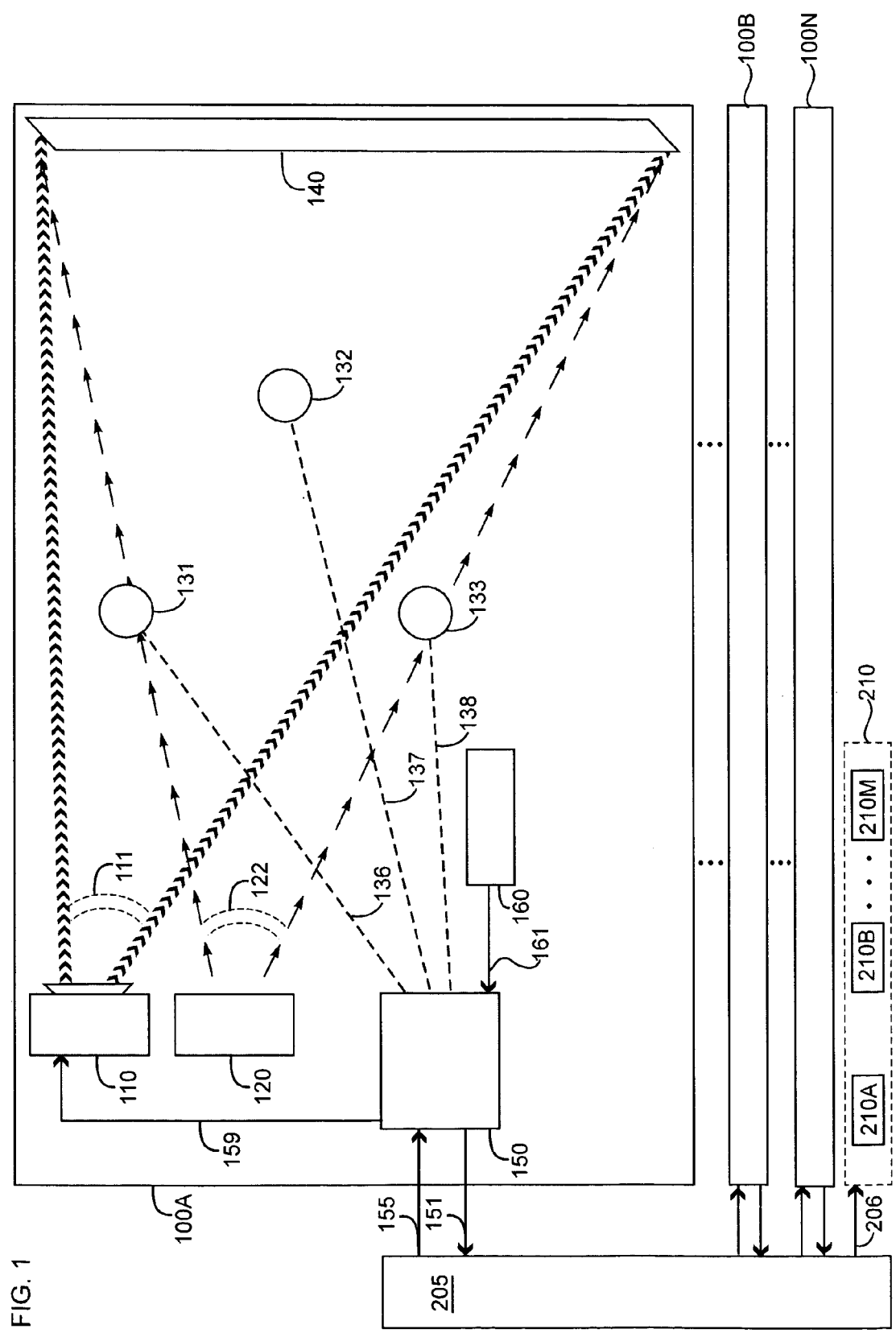
FIG. 1 is a block diagram of an anti-piracy system with compliance sensing and reporting of security compliance (and other information) to one or more reporting centers.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

A movie anti-piracy system with compliance sensing and compliance violation (and other information) reporting is provided. The illustrated embodiment of FIG. 1 shows the use of infrared energy projection as one type of anti-piracy means. Any other type of anti-piracy means is also compatible with the anti-piracy compliance sensing and reporting aspects of the present invention. Referring to FIG. 1, a movie projector 110 projects a light image 111 to reflect off of screen 140, while an infrared energy projection source 120 generates an infrared energy pattern 122 which is reflected off the screen 140 (or otherwise projected) in the same field of view as the light images 111 reflecting from the screen 140 and into a seating area of the theater. Examples of commercially available infrared (IR) energy projection sources include IR flood heating lamps (e.g., IR flood heating lamps for restaurants), IR flood lights for airports, IR point sources (e.g., IR point sources for automatic door openers), tunable IR lasers (e.g., tunable IR lasers commercially available from Lucent Technologies, Inc.). Infrared energy sensors 131, 132 and 133 are positioned for detecting the infrared pattern in the seating area of the theater 100A. The infrared sensors 131, 132 and 133 provide sensed signals 136, 137 and 138 respectively to a sensor response controller 150. The controller 150 is responsive to the sensor signals 136, 137 and 138 to provide an infrared status (and other data) signal 151 output to a control center 205. The control center 205 responds to the infrared status and other data signals 151, from one or a plurality of theaters 100A, 100B, . . . 100N (where N is the total number of theaters considered) and provides for reporting of information (such as security compliance, attendance, etc.) to one or multiple reporting sites 210—such as movie distribution studios, etc., designated in FIG. 1 as separate recipients 210A, 210B, . . . 210M (where M is the total number of recipients considered).

In a preferred embodiment, the control center 205 determines whether the infrared energy sensors (other anti-piracy compliance sensing), or other data indicate violation of anti-piracy protection within a theater, and responsive to the anti-piracy compliance sensing, provides reporting on the status and data. If a violation is indicated, then the control center 205 reports the violation and/or sends a violation output 155 such as to the sensor response controller 150 which can generate a report, and/or trigger an alarm and/or activate a violation inhibit output 159 to shut down the movie projector 110. This shut down of the projector is an optional feature. In a preferred embodiment, the shut down can be overridden with the entry of an appropriate security code. The control center can be comprised of a standard personal computer (PC): with processor, memory, storage, input/output interfaces, communications interfaces; utilizing any operating system (OS) software, including, but not limited to Windows, Macintosh and Linux; having program code to provide the necessary logic, control, management and reporting functionality. Alternatively, hardware and software can be selected or designed for cost reduction purposes or special performance needs. Examples of commercially available infrared (IR) energy projection sources include IR flood heating lamps (e.g., IR flood heating lamps for restaurants), IR flood lights for airports, IR point sources (e.g., IR point sources for automatic door openers), tunable IR lasers (e.g., tunable IR lasers commercially available from Lucent Technologies, Inc.).

A data entry sub-system 160 permits entry of additional data which is communicated as signal 161 to the sensor response controller 150. The controller 150 provides for processing the data from the data entry 160 and communicating to the control center 205. The additional data can include ticket sales for one or more movies, attendance data, security code, etc.

In a preferred embodiment, there are a plurality of theater systems 100A, 100B, . . . 100N (where N is the total number of theater systems considered), each of which has an equivalent anti-piracy system installed, each providing reporting back to the control center 205 which provides overall system control. In this embodiment, the control center is a single common control center coupled to all of the status signals being reported from all of the plurality of theater systems. Alternatively, there can be a plurality of distributed ones of the control centers.

Figure 2:
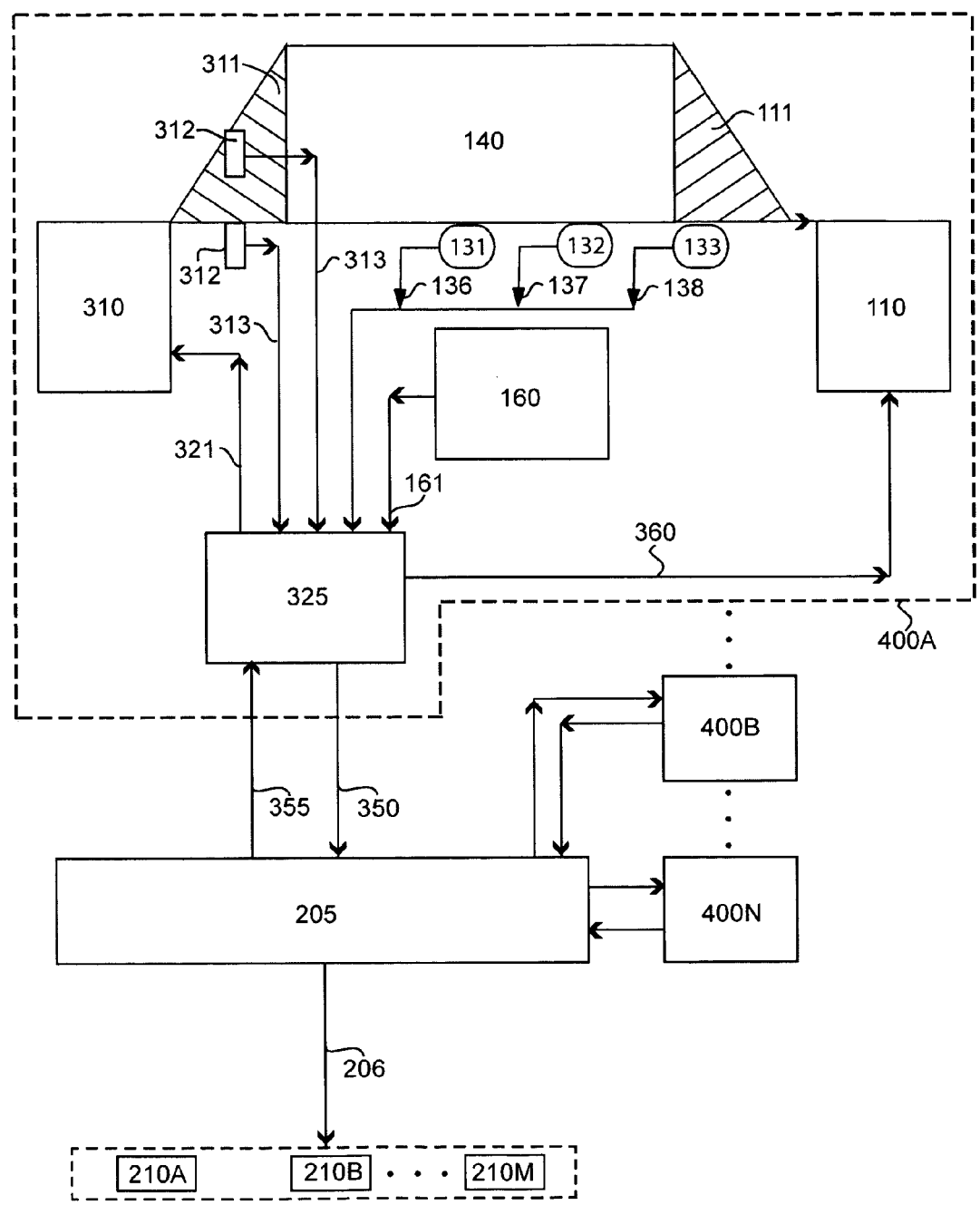
FIG. 2 is a block diagram of an alternative system configuration to that of FIG. 1.

Referring to FIG. 2, an alternative embodiment of a movie anti-piracy system with sensing and reporting is provided. The movie projector 110 projects a light image 111 to reflect off of screen 140, while an infrared energy emission 311 is generated by a tunable infrared light source (such as a laser) 310 and projected to reflect off the screen 140. The tunable infrared laser 310 is controlled by a controller 325 which generates control signals 321. The controller 325 handles functions including, but not limited to, generating the pattern (defining target locations over time) with which to scan the screen with the tunable infrared light source 310, the intensity of the infrared light source (e.g. Laser) generation and projection, the frequency of projections onto the screen, and when to stop projecting. Safety sensors 312 are positioned for detecting an object interfering with the line of projection of the laser. A safety signal 313 is sent from the safety sensors 312 to the controller 325 when an object interferes with the line of the projection of the tunable infrared light source 310 onto the screen 140. The safety signal can be utilized by the controller 325 to trigger an alarm and to shut off the output from the infrared light source 310. Additionally, as discussed above with reference to FIG. 1, the infrared sensors 131, 132, 133 provide sensed signals 136, 137 and 138 to the controller 325 to permit detecting and notifying of a violation.

Figure 3:
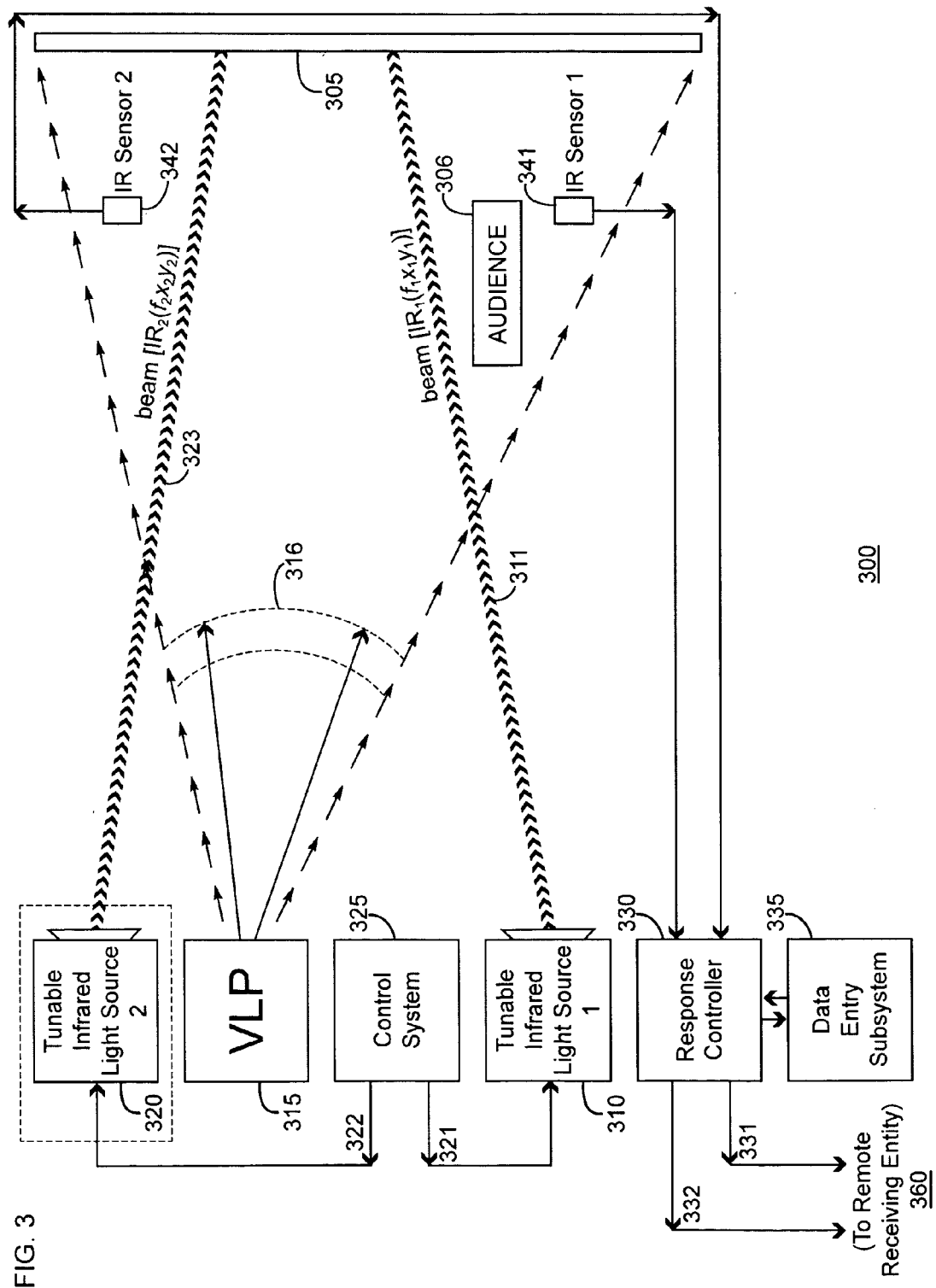
FIG. 3 is a block diagram of a multiple infrared light source embodiment of an in-theater anti-piracy system.

FIG. 3 illustrates a multiple infrared light source embodiment of the anti-piracy system 300. An anti-piracy system (300) is provided for use with a projection screen (305) for viewing by an audience (306) such as in a movie theater. The system is comprised of a Visible Light Projector (315), tunable frequency infrared light sources (310, 320) and a control system (325).

The Visible Light Projector (315) projects visible light images (316) for a visual presentation onto the screen (305), during a defined time, for viewing by the audience (306). Visible Light Projectors that are commercially available include film projectors and digital light projectors manufactured by Christie, Barco, Panasonic and others.

The first tunable frequency infrared light source (310) is responsive to a control signal (321), for selectively projecting a beam (311) (beam[IR($f_1 x_1 y_1$)]) of infrared light (of a certain frequency wavelength $f_1$) onto a targeted position (x,y) onto the screen.

The control system (325) provides control logic for generating a first control signal (321) to programably vary, during the defined time, the frequency ($f_1$) of the first tunable infrared light source and to vary the targeted position ($x_1, y_1$) on to the screen; wherein the visible light images and the beam of infrared light are superimposed onto the screen. Control systems can be comprised of a standard personal computer (PC): with processor, memory, storage, input/output interfaces, communications interfaces; utilizing any operating system (OS) software, including, but not limited to Windows, Macintosh and Linux. The control system (325) programably varies, during the defined time, the targeted position and the frequency of the tunable infrared frequency light source. The control system is in a preferred embodiment comprised of a processor, program logic, and memory. The logic utilized can be pseudo-random, algorithmically defined, predefined, frequency-hopping based, or otherwise, to define the control signal.

In a preferred embodiment, at least one infrared sensor (341) [IR Sensor 1] (as in sensors 131, 132 and 133 of FIG. 1) provides for sensing presence and absence of the beam infrared light projected onto and reflected off of the screen, during the defined time. Multiple IR sensors can be used, as shown with IR Sensor 2 (342). A sensor response controller (330) provides for generating a violation signal (331) responsive to the infrared sensor (341), and to the absence of the infrared light (311) projected onto and reflected off from the screen (305). Where other types of anti-piracy means are utilized (i.e., not infrared-based), then compliance violation sensing is for the respective type of anti-piracy means utilized. Responsive controllers can be comprised of a standard personal computer (PC): with processor, memory, storage, input/ output interfaces, communications interfaces; utilizing any operating system (OS) software, including, but not limited to Windows, Macintosh and Linux. A data entry subsystem (335) is coupled to the response controller (330), for providing for input of specific data for the respective theater for providing said theater specific data, which can include the violation signal or can be separately communicated as an output for communication to a remote receiving entity. The theater data (332) can be comprised of at least one of: identification of the theater, identification of the time of the movie being shown, identification of the movie being shown, identification of an operator of the movie equipment, attendance data for that movie, for a respective showing of the movie and identification code. Examples of Data Entry Subsystems include keyboards, automatic detection from movies' contents, magnetic key card entry, voice recognition, mouse or touch-screen input-based graphical user interface and/or menu-driven software supported and others.

In a preferred embodiment, the response controller further comprises a reporting controller that provides for outputting a violation signal responsive to sensing the absence of anti-piracy compliance (e.g., the absence of the beam of infrared light projected onto the screen.) [Alarm=safety notification or sensor signal to controller]; [Violation signal=non-compliance notification to a reporting site, or signal from sensor center to sensor response controller] The reporting controller can be comprised of a standard personal computer (PC): with processor, memory, storage, input/output interfaces, communications interfaces; utilizing any operating system (OS) software, including, but not limited to Windows, Macintosh and Linux.

For reporting, the output communication (331, 332) is coupled to at least one remote receiving entity (360). In one embodiment, the response controller (330) provides an output communication (332) in a batch mode for a plurality of showings of a particular movie, and provides identification information for each movie, the time it was shown, the presence of violation of anti-piracy operation during that time and other theater data. Alternatively, communications can be periodic, real time, or at scheduled reporting times.

In an alternate embodiment, the control system (325) generates a second control signal (322). A second tunable, frequency, infrared light source (320) is responsive to the second control signal (322), for selectively projecting a second beam (beam[IR($f_2x_2y_2$)]) of infrared light (323) at a selected infrared frequency ($f_2$) onto a second targeted position ($x_2y_2$) onto the screen (305). The control system (325) varies the first control signal (321) and the second control signal (322) each respectively, during the defined time, to vary each of the first targeted position ($x_1y_1$) and the second targeted position ($x_2y_2$). The control system (325) further varies the frequency ($f_1$, $f_2$) of the first tunable frequency infrared light source and the second tunable frequency infrared light source, respectively. The visible light images (316) and the first beam of the infrared light (311) and the second beam of infrared light (323) are all superimposed on the screen (305), and reflected there-off into the audience (306).

The control system (325) provides at each of finite instant of defined time, that the first position ($x_1y_1$) and the second position ($x_2y_2$) are different, and the first frequency ($f_1$) and the second frequency ($f_2$) are different. (See FIG. 5).

In a preferred embodiment, the infrared light source is a laser, or other coherent point light source, so as to permit writing patterns, text, images and signatures with the path traversed by the respective beam (311) or (323).

The anti-piracy control and reporting system utilizing the anti-piracy subsystem provides for use in preventing videotaping of a projected visible light image. The anti-piracy control system is comprised of an anti-piracy subsystem (e.g., an infrared energy based projection system), an anti-piracy compliance sensing (e.g., an infrared sensor) and a response and reporting controller.

The theater anti-piracy subsystem (300) is comprised of a Visible Light Projector (315) for projecting visible light images (316) for a visual presentation onto the screen (305) to provide, during a defined time (t), for viewing; at least one tunable frequency infrared light source (310, 320), responsive to a respective control signal (321, 322), for selectively projecting a respective beam of infrared light (311, 323) onto a respective targeted position (x, y) onto the screen (305); and a control system (325) for generating the respective control signal (321, 322) to programably vary, during the defined time, the respective frequency ($f_1$,$f_2$) of the tunable infrared light source (310, 320) and to vary the respective targeted position [($x_1$, $y_1$)($x_2$, $y_2$)] onto the screen; wherein the visible light images (316) and the respective one or more beams of infrared light (311, 323) are superimposed onto the screen.

At least one infrared sensor (341, 342) provides for sensing presence and absence of the beam or beams of infrared light (311, 323) projected onto the screen (305), during the defined time.

The response controller (330) provides for generating a violation signal (331) responsive to any infrared sensor (341, 342) signaling the absence of detecting the infrared light (311, 323) projected onto and reflected off from the screen (305).

Figure 4:
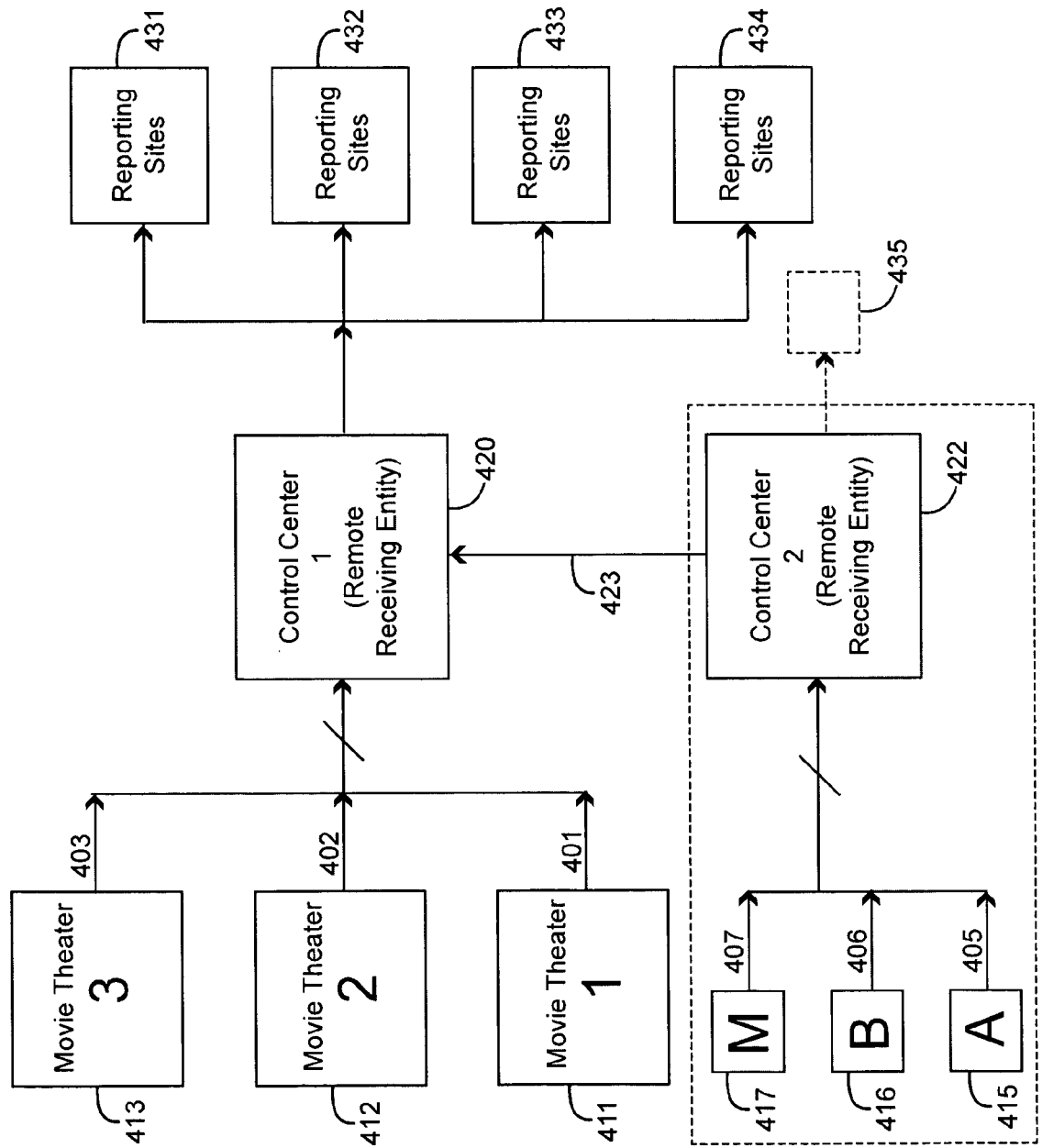
FIG. 4 is a block diagram of an overall system for a multiple subsystem embodiment.

FIG. 4, illustrates an overall system embodiment wherein there are a plurality of theater anti-piracy subsystems (411-413), each in a separate theater area (e.g., a separate movie viewing area) and each having a separate response reporting controller providing a respective separate output communication (401-403) (405-407). At least one remote receiving entity (421) provides for receiving communications from the plurality of movie theater subsystems and accumulates and generates a summary report responsive thereto. There can be a plurality of remote receiving entities (421, 422) each acting as a control center and outputting a summary report to one or more reporting sites for its respective associated group of anti-piracy systems (411-413 or 415-417). Alternatively, each of the secondary control centers (422) can couple its report summary communications (423) to the first control center (421) which exclusively outputs customized summary reports to reporting sites (431-435). In this embodiment, the first control center acts as a single common control center.

At least one reporting site (431-435) receives the summary report.

Where there are a plurality of reporting sites (431-435), each receives a custom selectively filtered summary report for its respective associated movies and theaters.

For example, the reporting sites can be movie production companies, movie distribution companies, copyright holders, trade groups (e.g., Motion Picture Association of America (MPAA)), etc.

Figure 5:
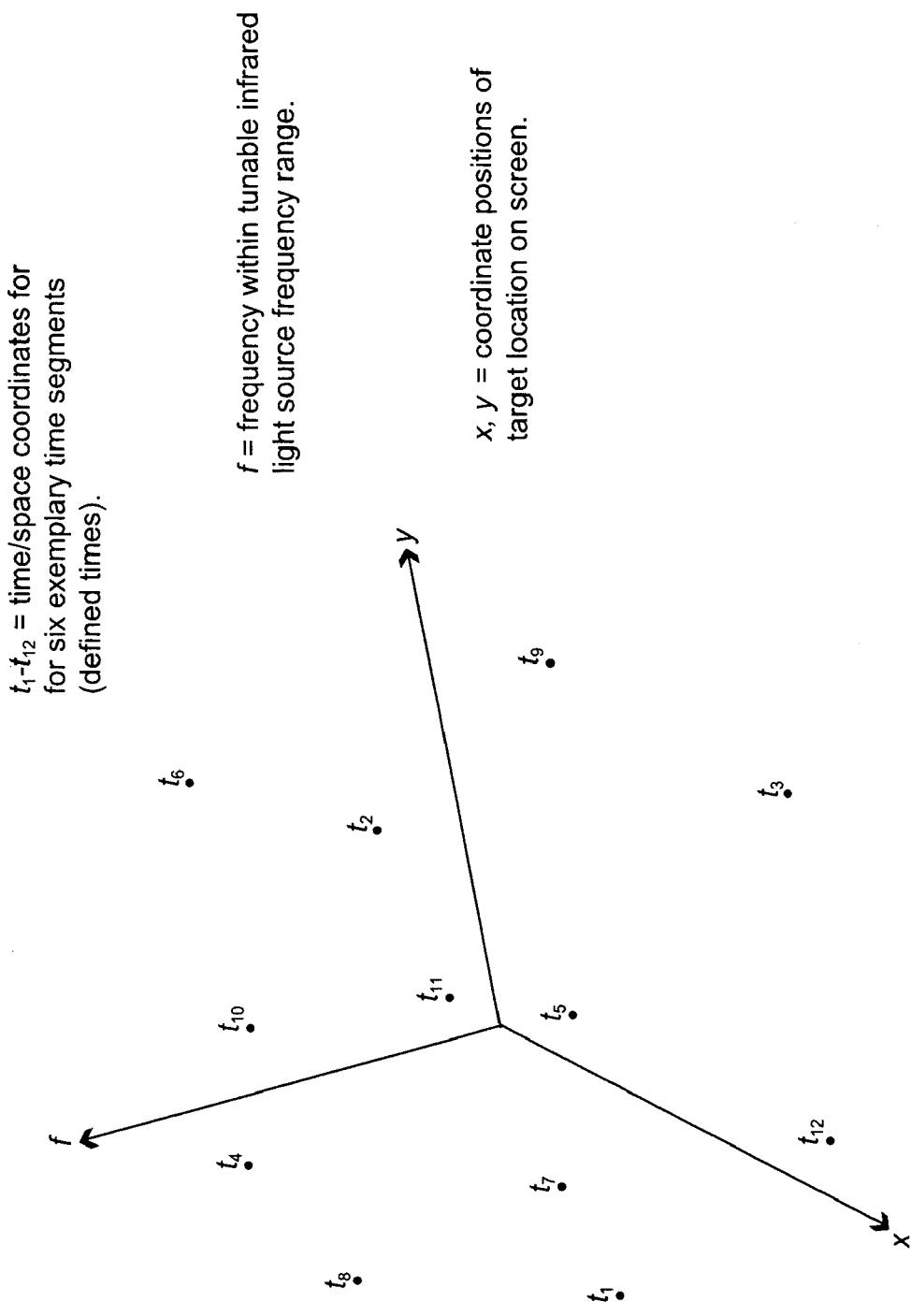
FIG. 5 is a multi-dimensional mapping of time, frequency and target locations responsive to the central subsystem.

Referring to FIG. 5, a multi-dimensional mapping is provided showing the mapping over time of the tunable infrared light source's frequency (f), and target location (x,y) defined by the control signal for a plurality of defined times, as a plurality of time space coordinates for twelve (12) exemplary time signals as illustrated for the defined times $t_1$ to $t_{12}$. The control subsystem provides a control signal which varies the (f,x,y) variables of the tunable infrared light source frequency and target location to vary throughout the multi-dimensional space mapping for each of a plurality of defined times during which the control signal provides a unique different signal each time. Where a plurality of separate infrared light sources are utilized, each can have its own unique control signal (to permit multiple patterns to be "written" with infrared light) or a single control signal can be commoned to go to two or more tunable infrared light sources (to provide a reinforced single pattern).

For example, as illustrated in FIG. 5, at time $t_1$, the y parameter is near its minimum value (the target location near the bottom of the screen, for example) while the x value is large indicating near the right side of the screen, for example, and the f value is low indicating a low frequency portion of the tunable frequency range of the tunable source.

At the next defined time ($t_2$), a new control signal ($CSt_2$) provides a different (f,x,y) set, illustrated with x as a small number (indicating to the left of the screen), y as a medium number (indicating approximately halfway up the screen), and f as slightly lower than it was for $t_1$.

At defined time $t_3$, both the x and y values are relatively large (indicating near the upper right corner of the screen), and the f value is slightly lower than the frequency value at time $t_2$ which was slightly lower than that at time $t_1$.

However, at defined time $t_4$, the frequency of the tunable laser is increased considerably to the upper part of its range, with the x value being relatively low (indicating near the left side of the screen), and the y value being near zero, (indicating at the bottom of the screen).

In a similar manner, a new control signal ($CSt_n$) is output for times $t_5$-$t_{12}$, providing new values for (f,x,y).

It is to be understood that the illustrated example of FIG. 5 shows a pattern generation being performed by the mapping by the control system (to generate a respective control signal) of x,y locations and frequency to relatively defined-time segments.

For patterns such as writing text (e.g., indicating the name, date and other theater identification information), the control system maps the x,y coordinates for subsequent defined time segments appropriately close to each other for a plurality of sequential ones of the defined time segments. This would permit writing of messages (e.g., "This is an illegal copy, do not duplicate, made at the xyz theater on Jun. 12, 2000"). The control system provides the logic needed for mapping locations versus defined time segments to create the desired pattern. The control system also controls varying of the frequency component over time, so that it will be difficult to defeat the anti-piracy system by use of infrared filters. The system can use any one of a variety of known techniques, such as frequency hopping, pseudo-random generation of frequencies within a range, stochastic modulation of a number generator, algorithmically derived, adaptively modified—based upon an independent variable (e.g., time of day) and many other ways can be used to vary the frequency used during each of the defined time segments to prevent defeat of the anti-piracy system by placement of infrared filters in front of the camera lens to attempt to block and filter the infrared beam reflection back into the field of view of the camera lens filming or videoing the movie off the screen. Additionally, the duration of each of the defined times (illustrated as $t_1$-$t_{12}$) and the time between the control signals can be selectively adjusted (e.g. programmably) by the control system to permit further refinements of writing messages or blocking patterns on the screen with the infrared beam responsive to the control signal output from the control system. Examples of blocking patterns include hashes, lines, stepping or pulsating blobs, pulsating irregular polygons, written text messages, predefined or other graphics, etc.

The control system can be implemented with many types of technology, ranging from a general purpose computer running Windows, Macintosh OS, LINUX, UNIX, or a control executive program, and utilized to implement the control system functionality. Alternatively, processing power contained elsewhere in the system can provide this function via time share and software utilization. Dedicated custom electronic and computer solutions can also be provided. These can range from simple predetermined gating logic, to finite state machines implemented with memories and logic, to programmable devices, subsystems or systems which provide the necessary programming logic to define the control signal output in accordance with a desired pattern and to provide the mapping as necessary to generate the control signals therefore.

Figure 6:
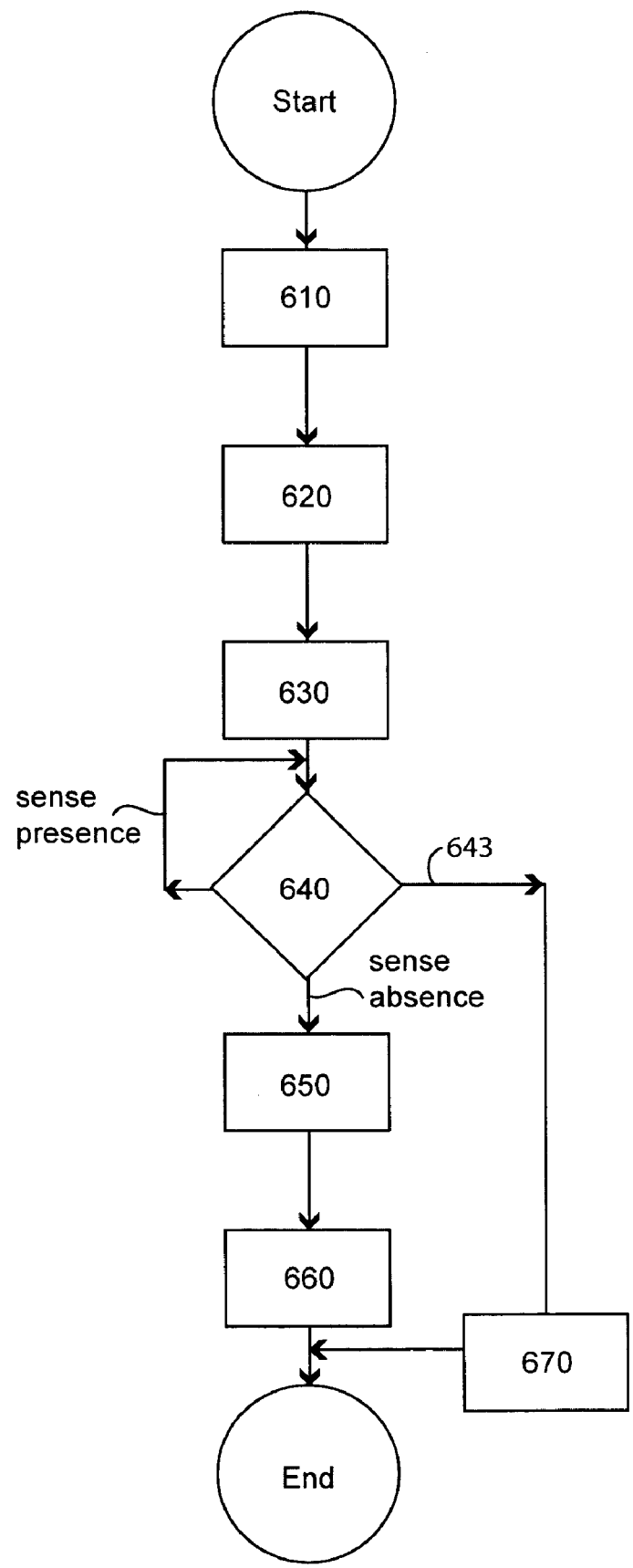
FIG. 6 illustrates the methodology of preventing pirate camcorder taping of a projected movie.

As illustrated in FIG. 6, and in accordance with the present invention, there is provided a method for preventing videotaping for use with a projection screen for viewing by an audience. The method is comprised of: projecting visible light images for a visual presentation onto the screen to provide, during a defined time, for viewing (step 610); using a first tunable frequency infrared light source selectively projecting a first beam of infrared light onto a first targeted position onto the screen, responsive to a first control signal (step 620) and generating the first control signal to programably vary, during the defined time, the frequency of the first tunable infrared light source and to very the first targeted position on to the screen; wherein the visible light images and the first beam of infrared light are superimposed onto the screen (step 630).

The method further comprises: sensing presence and absence of the first beam of infrared light projected onto the screen, during the defined time (step 640) and generating a violation signal responsive to the infrared sensor, and to the absence of the first beam of infrared light projected onto the screen (step 650). The violation signal is output responsive to sensing the absence of the first beam of infrared light projected onto the screen (step 660).

An output communication is provided responsive to the sensing presence and absence (step 670). Preferably, at least one remote receiving entity is coupled to receive the output communication. Preferably, the first tunable infrared light source is a tunable infrared laser.

In one embodiment, the method further comprises generating a second control signal (step 680); projecting a second beam of infrared light using a second tunable, frequency, infrared light source onto a second targeted position onto the screen, responsive to the second control signal (step 685); varying the first control signal and the second control signal each respectively, during the defined time, to vary each of the first targeted position and the second targeted position (step 690), and varying the frequency of each of the first tunable frequency infrared light source and the second tunable frequency infrared light source (step 695).

The visible light images and the first beam of the infrared light and the second beam of infrared light are all superimposed on the screen.

At a plurality of sequential windows of defined times, the first position and the second position are made to be different, and the frequency of the first tunable frequency infrared light source and of the second tunable frequency infrared light source are made to be different at each of the defined times.

In a preferred embodiment, step 620 further comprises programably varying during each of the defined times, the first targeted position and the frequency of the first tunable infrared frequency light source during the defined time. Where two infrared light sources are present, the step 620 programably varies, both the first and second targeted positions and the frequency of both the first and second tunable infrared light source.

In a preferred embodiment, each of the steps 650, 660 and 670 is further comprised of providing specific data for a respective theater, and providing the specific data along with the violation signal as an output for communication to a remote receiving entity.

The theater data can be comprised of one or more of: identification of theater, global positioning system (GPS) location data, identification of at least one of date and time of a movie being shown, identification of the movie being shown, identification of an operator of movie equipment, attendance data for a respective showing of the movie, and identification code, etc.

In an alternate embodiment, step 670 is further comprised of providing an output communication of a batch mode for a plurality of showings of a particular movie, and providing identification information for each movie, and any presence of violation of anti-piracy operation during that time.

Figure 7:
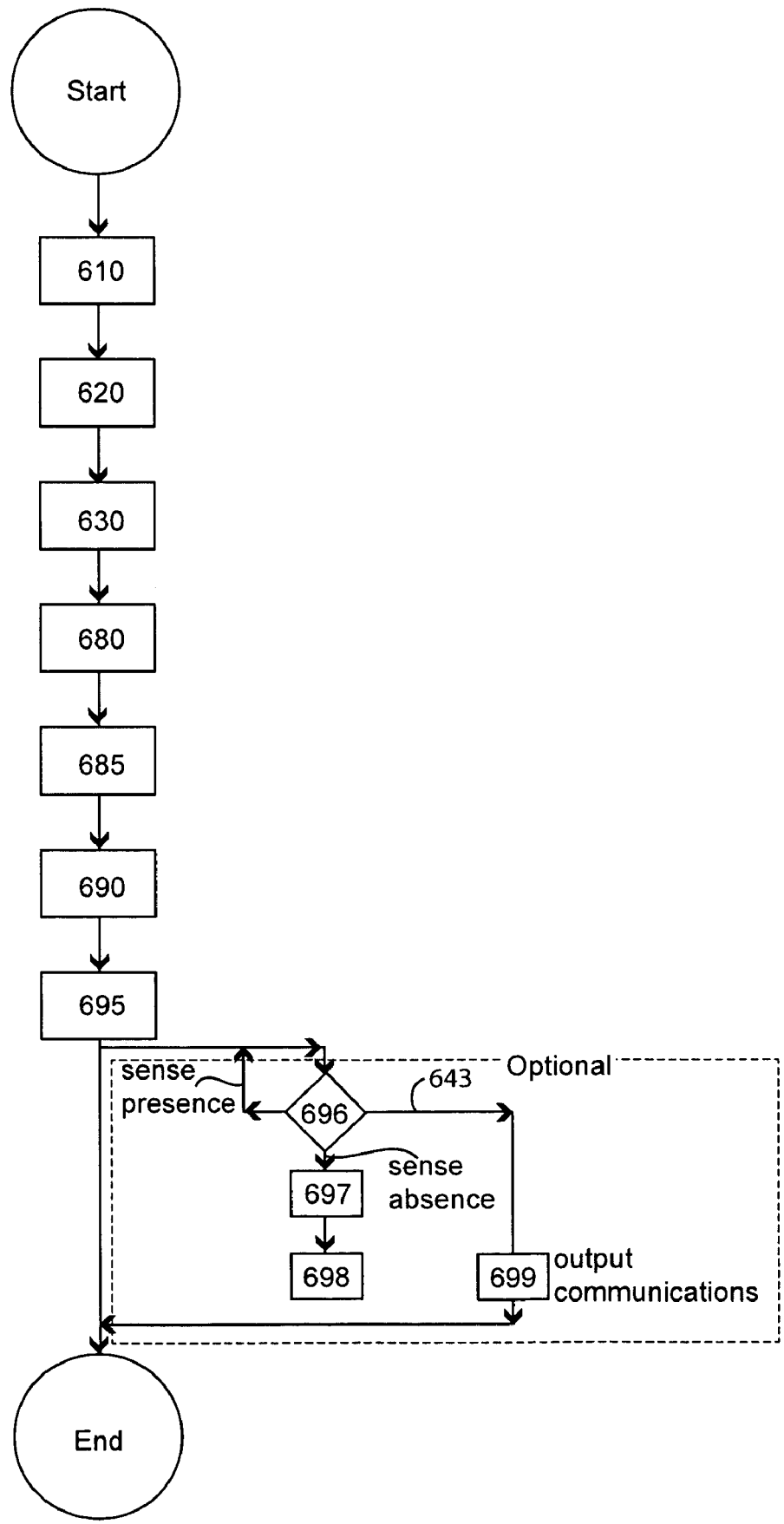
FIG. 7 illustrates an alternative methodology to that of FIG. 6.

FIG. 7 illustrates an alternative anti-piracy method for use in preventing videotaping of a projected visible light image. As illustrated, the method comprises: projecting visible light images for a visual presentation onto the screen to provide, during a defined time for viewing (step 610) [Step 1]; selectively projecting a beam of infrared light from a tunable frequency infrared light source, responsive to a control signal onto a targeted position onto the screen (step 620 and/or step 685) [step 2]; generating the control signal to programably vary, during the defined time, the frequency of the tunable infrared light source and to vary the targeted position on to the screen (step 620 and/or step 685) [step 3]; sensing presence and absence of the beam of infrared light projected onto the screen, during the defined time (step 640 and/or step 696) [step 4]; generating a violation signal responsive to the infrared sensor, and to the absence of the infrared light projected onto the screen (step 650 and/or step 697) [step 5]; providing an output communication responsive to the violation signal (step 670 and/or step 699) [step 6].

In a preferred embodiment, the method provides for coupling the output communication to at least one remote receiving entity.

In one embodiment, there are a plurality of movie theaters, each using the anti-piracy method as in steps 1-6, each providing a separate respective output communication.

The respective communications from the plurality of the movie theaters, is received at least one remote receiving entity accumulating, storing and generating a summary report responsive thereto, and reporting to a reporting entity (e.g., a movie studio) by any conventional means (mail, electronic mail, facsimile, telephone, data network connection, etc.) Preferably, the summary report is communicated to at least one reporting site on a regular basis, such as by a daily, weekly or monthly subscription service.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method for preventing videotaping of a movie prior to, during or after projecting onto a projection screen for viewing by an audience, the method comprising:
projecting visible light images onto the projection screen to provide for a visual presentation;
selectively providing an anti-piracy means to preclude videotaping of the movie;
sensing an absence of the anti-piracy means; and
generating a violation signal responsive to the sensing an absence.

2. The method as in claim 1, further comprising: communicating security compliance information as an output communication responsive to one of sensing a presence of the anti-piracy means and the sensing an absence of the anti-piracy means.

3. The method as in claim 2, further comprising: receiving the output communication at a remote receiving entity.

4. The method as in claim 1, further comprising: shutting-down the projecting of the visible light images responsive to the violation signal.

5. The method as in claim 2, further comprising: providing specific data associated with a respective theater, along with the violation signal as an output for communication to a remote receiving entity.

6. The method as in claim 5, wherein the specific data is theater data comprised of one or more of:
identification of theater, global positioning system (GPS) location data, identification of at least one of date and time of a movie being shown, identification of the movie being shown, identification of an operator of movie equipment, attendance data for a respective showing of the movie, and an identification code.

7. The method as in claim 1, further comprising: providing an output communication for a plurality of showings of a particular movie;
providing identification information for said movie; and
providing identification information related to any presence of the violation signal occurring during the plurality of showings.

8. An anti-piracy method for use in preventing videotaping prior to, during or after projecting of a projected visible light image, the method comprising:
projecting a projected visible light image to provide a visual presentation for viewing, to reflect from a screen;
implementing means for preventing the videotaping of the projected visible light image;
sensing an absence of the means for preventing the videotaping; and
generating a violation signal responsive to the sensing an absence of the means for preventing.

9. The method as in claim 8, further comprising: providing an output communication responsive to the violation signal.

10. The method as in claim 9, further comprising: coupling the output communication to at least one remote receiving entity.

11. The method as in claim 9, wherein there is a plurality of movie theaters, and each using the anti-piracy method, each providing a separate respective output communication.

12. The method as in claim 11, further comprising:
accumulating and storing at least one separate respective output communication from the plurality of the movie theaters by at least one remote receiving entity; and
generating a summary report responsive to the accumulating and storing.

13. The method as in claim 8, further comprising: reporting the violation signal to a remote reporting entity.

14. The method as in claim 13, wherein the reporting is via at least one of: mail, electronic mail, facsimile, telephone, and data network connection.

15. The method as in claim 12, further comprising: communicating the summary report to at least one reporting site on a regular periodic basis.

16. An anti-piracy system to prevent videotape recording of a movie prior to, during or after projecting as a light image to reflect off of a screen, the system comprising:

an anti-piracy subsystem comprising:

means for interfering with the videotape recording of the movie;

means for providing a status signal output responsive to sensing an absence of operation of the means for interfering; and a control system for generating a violation signal responsive to the sensing of an absence of operation of the means for interfering with the videotape recording.

17. The system as in claim 16, wherein the control system provides for communicating the violation signal as a communicated signal to a reporting subsystem.

18. The system as in claim 17, wherein there is a plurality of the anti-piracy subsystems, each providing a respective one of a plurality of communicated signals; and wherein the reporting subsystem provides for respectively storing a plurality of the communicated signals from the plurality of anti-piracy subsystems, and for accumulating a history of the violation signals responsive to the plurality of communicated signals.

19. The system as in claim 18, wherein the reporting subsystem provides for generating a report responsive to the history.

20. The system as in claim 19, wherein each of the plurality of anti-piracy subsystems is located in a respective one of a plurality of respective theaters; and wherein the report is communicated to at least one of the plurality of respective theaters.

* * * * *